United States Patent [19]

Neugebauer et al.

[11] Patent Number: 5,084,523
[45] Date of Patent: Jan. 28, 1992

[54] THERMOPLASTIC MOLDING COMPOSITIONS BASED ON POLYPHENYLENE ETHERS

[75] Inventors: Wolfgang Neugebauer, Duelmen-Merfeld; Joachim Muegge, Haltern, both of Fed. Rep. of Germany

[73] Assignee: Huels Aktiengesellschaft, Marl, Fed. Rep. of Germany

[21] Appl. No.: 394,061

[22] Filed: Aug. 14, 1989

[30] Foreign Application Priority Data

Oct. 13, 1988 [DE] Fed. Rep. of Germany ....... 3834912

[51] Int. Cl.$^5$ .................... C08L 71/12; C08L 77/00
[52] U.S. Cl. .................................. 525/397; 525/92; 525/132
[58] Field of Search ................. 525/397, 905

[56] References Cited

U.S. PATENT DOCUMENTS 4,873,276 10/1989 Fujii et al. .................... 525/397

*Primary Examiner*—Jacob Ziegler
*Attorney, Agent, or Firm*—Oblon, Spivak, McClelland, Maier & Neustadt

[57] ABSTRACT

Molding compositions containing polyphenylene ether, polyamide, at least one aspartic acid derivative and optionally, a styrene resin and/or impact strength promoter. These compositions have high strength combined with good thermal stability and solvent resistance.

11 Claims, No Drawings

THERMOPLASTIC MOLDING COMPOSITIONS BASED ON POLYPHENYLENE ETHERS

BACKGROUND OF THE INVENTION

1. Field of the Invention

The present invention is related to thermoplastic molding compositions containing polyphenylene ether, a polyamide and an aspartic acid derivative.

2. Discussion of the Background

Polyphenylene ethers (PPE) are industrial high-performance thermoplastics with high melt viscosities and softening points. They are suitable for numerous industrial applications in which stability at high temperatures is important (See U.S. Pat. No. 3,306,874, U.S. Pat. No. 3,306,875, U.S. Pat. No. 3,257,357, and U.S. Pat. No. 3,257,358). Certain properties of polyphenylene ethers are also undesirable for industrial applications. For example, shaped parts made of polyphenylene ethers are brittle because of poor impact strength.

The high melt viscosities, which lead to difficulties in processing, are also a drawback. Further, polyphenylene ethers tend to be unstable and to discolor at high temperatures.

Polyphenylene ethers are soluble or swell very severely in many organic solvents. The result of this property is that they are unsuitable for applications in which they come into contact with such solvents.

It is well known that the properties of polyphenylene ether resins can be improved by blending with other polymers. Thus, for example, blends of polyphenylene ethers with high-impact strength polystyrenes have attained rather great industrial importance (See German Patents 21 19 301 and 22 11 005). These blends can be processed into molded parts with adequate toughness, but they have the drawback that their thermal stability decreases with increasing polystyrene content. These blends also have unsatisfactory solvent resistance.

Blends of polyphenylene ethers with polyamides show good flow properties and good solvent resistance (DE-OS 16 94 290, JP-A-78/47 390), but as a rule brittle products are obtained, since the two components are only poorly dispersible in one another. Aromatic polyamides such as those used in EP-OS 0 131 445, for example, also process poorly with polyphenylene ethers. Better compatibility of the two phases is achieved by functionalizing the polyphenylene ether, for example with maleic anhydride in the presence of sources of radicals (JP-OS 74/66 452). The use of radical formers, however, can lead to undesirable and uncontrolled partial gelling of the PPE phase.

It has therefore been proposed to increase the compatibility of the two polymers by adding a sufficient amount of aplasticizer, for example of an organic phosphate (EP-OS 0 129 825) or of a diamide (EP-OS 0 115 218). Such methods are unsatisfactory, since the improved compatibility has to be obtained at the expense of reduced thermal stability.

Molding compositions to which have been added copolymers of styrene and unsaturated acid derivatives have the same drawback (EP-OS 0 046 040).

The object of European Patent 0 024 120 is resin compositions that consist of a polyphenylene ether, a polyamide, a third component, and optionally, high molecular weight rubber polymers. A liquid diene polymer, an epoxide, or a compound with a double or triple bond and a functional group (such as an acid, anhydride, ester, amino group, or alcohol group) can be used as the third component. However, the toughness of the resin compositions obtained is inadequate for many applications. Added to this is the fact that most compatibility promoters such as maleic anhydride, are toxic and readily volatile. This may cause great problems for the operator during processing.

A process is described in JP-OS 74/86 653 in which 100 parts of polyphenylene ether is grafted with 10 to 300 parts of a mixture of 50 to 99% styrene and 50 to 1% unsaturated carboxylic acids or their anhydrides, by a radical method. The product is blended with polyamides. The molding compositions obtained do have very good mechanical properties, but the thermal stability decreases sharply because of the substantial fraction of polystyrene.

WO 85/05 372 describes the functionalizing of polyphenylene ethers by melting with hydroxypolycarboxylic acids or their derivatives. After blending with polyamides molding compositions are obtained whose elongations at failure and notched impact strengths indicate unsatisfactory bonding at the phase boundaries. The use of strong organic acids and the presence of water, which is formed during the functionalization, lead to the expectation of serious corrosion problems in continuous operation.

Similarly to this, in WO 86/02 086, a polyphenylene ether is functionalized by reaction with trimellitic anhydride acid chloride in solution. Blends with polyamides seem to show better property trends than in the previous case, but this process has the great drawback that either hydrogen chloride is formed or the polyphenylene ether solution contains substantial amounts of chlorides, if a tertiary amine is added, which have to be completely removed before blending because of their corrosive action on machinery and molds. Direct isolation of the polyphenylene ether by removing the solvent, which is economically superior to precipitation with methanol, is impossible in this case.

SUMMARY OF THE INVENTION

Accordingly, one objective of this invention is molding compositions that can be processed readily, are suitable for producing molded parts, and which are solvent-resistant and have high impact strength on the one hand, and have high thermal stability on the other.

This and other objects which will become apparent from the following specification have been achieved by the present molding compositions which contain the following components:

a) 1–60 parts, preferably 10–50 parts polyphenylene ether, b) 40–100 parts, preferably 45–80 parts polyamide, and c) 0.1–5 parts, preferably 0.5–3 parts of at least one aspartic acid derivative of the formula

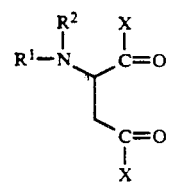

where X is OH, OR, or $NR_1R_2$, in which R is an alkyl or aryl group with up to 10 carbon atoms and $R_1$ and $R_2$, independently of one another, are hydrogen, an alkyl, cycloalkyl, hydroxyalkyl, or aryl group, each with up to 10 carbon atoms, an alkyl- or aryl-acyl group or alkyl- or aryl-substituted sulfonyl group, each with up to 14 carbon atoms, or $R_1$ and $R_2$ combined stand for a tetra- or pentamethylene group,
d) 0–30 parts of a styrene resin, and
e) 0–30 parts of an impact strength promoter.

DETAILED DESCRIPTION OF THE PREFERRED EMBODIMENTS

To produce a molding composition having the desired properties, it is important first to make a preliminary molding composition by a hot mixing process from the polyphenylene ether, aspartic acid or its derivative, and optionally the styrene resin and the impact strength promoter, and then secondly to blend this preliminary molding composition with the polyamide.

Useful polyphenylene ethers are especially polyethers based on 2,6-dimethylphenol, with the ether oxygen of one unit on the benzene ring being bonded to the adjacent unit. In general, o,o'-di-n-alkylphenols, whose alkyl groups preferably have a maximum of 6 carbon atoms, are useful for preparing the polyphenylene ethers. Phenols that are substituted in only one ortho position by a tertiary alkyl group with up to 6 carbon atoms, especially a tertiary butyl group, are also suitable. Each of the monomeric phenols mentioned can be substituted in the 3- and 5-positions by a $C_{1-6}$-alkyl group. Of course, mixtures of the monomeric phenols mentioned here can also be used.

The polyphenylene ethers can be prepared from the phenols in the presence of complexing agents such as cupric bromide and morpholine, for example (See DE-OS 32 24 692 and OS 32 24 691). The viscosity numbers (J) determined by the method of DIN 53 728 in chloroform at 25° C. are in the range of 20 to 80 $cm^3/g$.

Preferred polyamides are homopolymers and copolymers that are, preferably, partially crystalline and have exclusively aliphatic structures. Polyamides PA 6, PA 46, PA 66, PA 612, PA 1010, PA 1012, PA 11, and PA 12 may be mentioned in particular.

However, mixed aliphatic-aromatic copolyamides are also suitable (See U.S. Pat. No. 2,071,250, U.S. Pat. No. 2,071,251, U.S. Pat. No. 2,130,523, U.S. Pat. No. 2,130,948, U.S. Pat. No. 2,241,322, U.S. Pat. No. 2,312,966, U.S. Pat. No. 2,512,606, and U.S. Pat. No. 3,393,210; Kirk-Othmer, Encyclopedia of Chemical Technology, Vol. 18, John Wiley & Sons (1982) pages 328 to 435). The number average molecular weight of the polyamides is generally above 5000, preferably above 10,000. The upper limit is determined by the processability and is about 50,000 with the conventional polyamides.

Aspartic acid derivatives of the formula

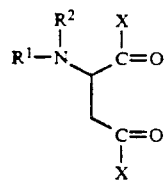

are preferably used in an amount of about 1 to 5 wt.% based on the polyphenylene ether. The following compounds are examples of suitable derivatives: aspartic acid, N-acetyl-, N-propionyl-, N-butyroyl-, N-pentanoyl-, and N-hexanoylaspartic acid, phthalimidosuccinic acid, N-methyl-, N-ethyl-, N-propyl-, N-butyl-, N-pentyl-, and N-hexyl aspartic acid, N-(2-hydroxyethyl)aspartic acid, and their esters with $C_{1-10}$ alkyl or aryl alcohols or $C_{1-10}$ alkyl amides.

The molding compositions pursuant to the invention may contain a styrene resin and/or an impact strength promoter. Styrene resins that may be considered suitable in the context of this invention are glass-clear polystyrene, high impact strength rubber-modified polystyrene (HIPS), or styrene-acrylonitrile copolymers. However, it must be noted that the thermal stability is generally reduced by the presence of styrene resins.

Suitable impact strength promoters are optionally functionalized rubbers and certain optionally functionalized partially crystalline thermoplastics that are familiar for their impact strength-increasing properties. Suitable examples are ethylene-propylene copolymers (EPM), ethylene-propylene-diene terpolymers (EPDM), polybutadiene, polypentenylene, polyoctenylene, polyethylene, statistical styrene-butadiene copolymers (for example DURANIT ® from Huels AG), or styrenebutadiene block copolymers, that may optionally be hydrogenated (for example KRATON ® from Shell Chemical Co.), or their mixtures. The functionalizing of rubbers is basically known and can be accomplished, for example, with maleic anhydride (See U.S. Pat. No. 3,884,882) or with the same aspartic acid derivatives (See German Patent Application P 38 04 185).

The thermoplastic compositions pursuant to the invention may also contain a flameproofing agent and other additives such as pigments, oligomers and polymers, antistatic agents, stabilizers, and processing aids as well as reinforcing agents. The proportion of reinforcing agent can be up to 50 wt%, that of flameproofing agents up to about 25 wt%, and that of all other additives up to a total of 5 wt%, based on the total molding composition in each case.

Suitable flameproofing agents, in particular, are aromatic phosphorus compounds such as triphenylphosphine oxide and triphenyl phosphate. A conventional halogenated flameproofing agent can also be used. Suitable halogenated organic compounds are those described, for example, in the monograph by H. Vogel "Flammfestmachen von Kunststoff", Huthig-Verlag, (1966), pages 94–192. However, halogenated polymers such as halogenated polyphenylene ethers, for example (see DE-OS 33 34 068) or brominated oligostyrenes or polystyrenes can also be used. The compounds should contain more than 30 wt.% halogen.

When flameproofing agents containing halogen are used, it is recommended to use a synergist. Suitable synergists are compounds of antimony, boron, and tin. These are generally used in amounts of 0.5 to 10 wt.% based on the thermoplastic compositions.

Suitable reinforcing agents are fiberglass and carbon fibers.

Suitable stabilizers include organic phosphites, such as didecylphenyl phosphite and trilauryl phosphite, sterically hindered phenols, and tetramethylpiperidine, benzophenone, and triazole derivatives.

Suitable processing aids are waxes, such as oxidized hydrocarbons, for example, and their alkali metal and alkaline earth metal salts.

The thermoplastic molding compositions pursuant to the invention are preferably made by first preparing a preliminary molding composition from all of the components except the polyamide and only subsequently adding the polyamide. The preliminary molding composition is preferably made in the melt at temperatures between about 200 and 320° C. It is also possible to do the mixing in the liquid phase or to add individual components in the form of a solution. For example, the aspartic acid derivative in an organic solvent can be added to a concentrated solution formed during the preparation of PPE.

The polyamides are combined with the preliminary molding composition by mixing the two melts in an efficient kneading unit at 250 to 350° C., preferably 270 to 310° C. It is preferable to premix the two components and extrude them. However, the polyamide can also be metered into the polyphenylene ether melt.

The impact strength promoter can also be added in the second mixing step, i.e., together with the polyamide. In this case it is possible to precompound it with the polyamide.

The molding compositions obtained can be processed by processes customary for processing thermoplastics, such as injection molding and extrusion to form molded objects. Examples of industrial fields of application are pipes, panels, cases, and other industrial items for the automobile, electric, and precision mechanics sectors.

The molding compositions pursuant to the invention are distinguished from conventional products by high strength with good thermal stability and solvent resistance.

In the following illustrative examples, the viscosity number (J) of the polyphenylene ether was measured in $cm^3/g$ by the method of DIN 53 728 at 25° C. in chloroform (concentration 5 g/l). The notched impact strength ($a_K$) of the molded compositions was measured at room temperature by the method of DIN 53 453 on small standard test pieces with rectangular notches injection molded at 290° C. The elongation at failure (epsilon$_R$) was determined by the method of DIN 53 455 on dumbbell-shaped test pieces injection molded at 290° C. The Vicat softening point B/50 from DIN 53 699 was determined on molded objects injection molded at 290° C. The term "parts" in the context of this invention means parts by weight.

Having generally described this invention, a further understanding can be obtained by reference to certain specific examples which are provided herein for purposes of illustration only and are not intended to be limiting unless otherwise specified.

EXAMPLES

1. Polyphenylene ether

Example 1 Mixture of polyphenylene ether and polyoctenylene

The polyphenylene ether was obtained by oxidative coupling of 2,6-dimethylphenol, terminating the reaction at the desired value of J, and then extracting the mixture by the method of DE-OS 33 13 864 and OS 33 32 377, which provided a J value of 52 $cm^3/g$.

A solution of 90 parts of this polyphenylene ether in 800 parts of toluene was combined with a solution of 10 parts of polyoctenylene (VESTENAMER ® 8012 from Huls AG, D-4370 Marl) in 50 parts of toluene. The solution was concentrated to 70% and the remaining solvent was removed by a degassing extruder. The mixture was granulated and dried.

2. Compatibility promoter

Example 2.1 DL-Aspartic acid, purity 98%, from the Aldrich Company, Milwaukee, USA Example 2.2

DL-N-(2-Hydroxyethyl)aspartic acid.

The corresponding substituted aspartic acid was prepared similarly to the method of U.S. Pat. No. 2,200,220 from 116.0 g of maleic acid and 61.0 g of ethanolamine.

Example 2.3

DL-N-Acetylaspartic acid.

The corresponding substituted aspartic acid was prepared by the method of C. C. Barker, J. Chem. Soc., (1953), p. 453, from DL-aspartic acid and acetic anhydride.

Example 2.4

Di-n-butyl DL-N-(2-hydroxyethyl)aspartate

The corresponding substituted aspartic acid ester was obtained by Michael Addition of ethanolamine to dibutyl maleate (reaction of the two components in equimolar amounts for 3 days at 25° C.).

3. Molding compositions and molded parts

Example 3.1

100 parts of the mixture from Example 1 was dissolved in 150 parts of toluene and was then treated with a slurry of 3.0 parts of powdered DL-aspartic acid in 20 parts of methanol. The solution was concentrated to 70% and the remaining solvent was removed by means of a degassing extruder at 300° C. The product was granulated and dried.

41.2 parts of this preliminary molding composition was mixed with 60 parts of polyamide 12 (VESTAMID ® ×4887) in a twin-screw extruder at 290° C., pelletized from the strand, and dried. The product was injection molded into standard bars and tested.

Example 3.2

In the same way as Example 3.1, a molding composition was prepared using 3.0 parts of DL-N-(2-hydroxyethyl)aspartic acid (from Example 2.2).

Example 3.3

100 parts of the mixture from Example 1 were impregnated with a solution of 3.0 parts of DL-N-acetylaspartic acid (from Example 2.3) in a mixture of 10 parts of acetone and 10 parts of toluene. After soaking up of the solution, it was allowed to stand for 24 hours and was then dried at 80° C. in a vacuum-drying oven. It was then remelted in a degassing extruder at 300° C., granulated, and dried.

41.2 parts of this preliminary molding composition were mixed in a twin-screw extruder at 290° C. with a blend of 54 parts of VESTAMID ® ×4887 and 6 parts of ethylenepropylene rubber (BUNA ® AP 301 from Bunawerke Huels GmbH, D-4370 Marl) that had been functionalized with 1% maleic anhydride and 0.2% dicumyl peroxide. The mixture was then granulated from the strand and dried. The product was injection molded to standard bars and tested.

Example 3.4

In the same way as in Example 3.3, a molding composition and molded parts were prepared using 3.0 parts of dibutyl DL-N-(2-hydroxyethyl)aspartate (from Example 2.4).

Example 3.5

100 parts of polyphenylene ether were impregnated with a mixture of 3.0 parts of dibutyl DL-N-(2-hydroxyethyl)aspartate (from Example 2.4) and 5.0 parts of toluene. In the same way as in Example 3.3, the mixture was dried, remelted, granulated, and dried. 40 parts of the preliminary molding composition thus obtained was mixed with 60 parts of VESTAMID® ×4887 in the same way as in Example 3.3.

Comparison Example A 40 parts of the mixture from Example 1 was mixed in a twin-screw extruder at 290° C. with 60 parts of polyamide 12 (VESTAMID® ×4887 from Huls AG, D-4370 Marl). It was then pelletized from the strand and dried. The product was injection molded to standard bars and tested.

Obviously, numerous modifications and variations of the present invention are possible in light of the above teachings. It is therefore to be understood that within the scope of the appended claims, the invention may be practiced otherwise than as specifically described herein.

and $R_2$ in combination are a tetramethylene or pentamethylene group.

2. The thermoplastic molding composition of claim 1, wherein said polyphenylene ether comprises repeating units of the formula

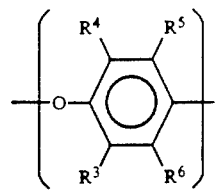

in which $R^5$ and $R^6$, independently of one another, are hydrogen or an alkyl group with up to 6 carbon atoms, $R^3$ is hydrogen and $R^4$ is a tertiary alkyl group with up to 6 carbon atoms, or $R^3$ and $R^4$, independently of one another, are an n-alkyl group with up to 6 carbon atoms.

3. The thermoplastic molding composition of claim 2, wherein said polyphenylene ether comprises repeating units of the formula

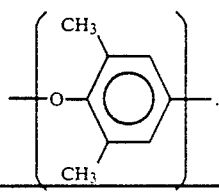

TABLE 1

Composition and Properties of Molding Compositions

| | Preliminary molding Composition | | | | Blended With | | | | Vicat |
|---|---|---|---|---|---|---|---|---|---|
| Example | Polyphenylene ether (parts) | Polyoctenylene (parts) | Aspartic acid of derivative from Ex. | Aspartic acid or derivative (parts) | PA 12 (parts) | EPM-g-MSA[1] (parts) | $a_K$ (kJ/m$^2$) | Epsilon$_R$ (%) | Temperature B/50 (°C.) |
| A | 36 | 4 | — | — | 60 | — | 2 | 2 | 162 |
| 3.1 | 36 | 4 | 2.1 | 1.2 | 60 | — | 14 | 37 | 164 |
| 3.2 | 36 | 4 | 2.2 | 1.2 | 60 | — | 16 | 49 | 164 |
| 3.3 | 36 | 4 | 2.3 | 1.2 | 54 | 6 | 22 | 43 | 163 |
| 3.4 | 36 | 4 | 2.4 | 1.2 | 54 | 6 | 27 | 52 | 164 |
| 3.5 | 40 | — | 2.4 | 1.2 | 60 | — | 7 | 32 | 164 |

[1] EPM functionalized with maleic anhydride

What is new and desired to be secured by letters patent of the United States is:

1. A thermoplastic molding composition comprising:
   a) 1–60 parts polyphenylene ether,
   b) 40–100 parts polyamide,
   c) 0.1–5 parts of an aspartic acid derivative of the formula:

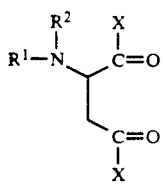

wherein X is selected from the group consisting of OH, OR and $NR_1R_2$, in which R is an alkyl or aryl group with up to 10 carbon atoms, and $R_1$ and $R_2$, independently of one another, are selected from the group consisting of hydrogen, alkyl, cycloalkyl, hydroxyalkyl, aryl group, each with up to 10 carbon atoms, alkyl-acyl group, aryl-acyl group, alkyl-substituted sulfonyl and aryl-substituted sulfonyl group, each with up to 14 carbon atoms, or $R_1$ 2. The thermoplastic molding composition of claim 1, wherein said polyphenylene ether comprises repeating units of the formula 4. The thermoplastic molding composition of claim 1, wherein said polyphenylene ether has a reduced specific viscosity of 20 to 80 cm$^3$/g.

5. The thermoplastic molding composition of claim 1, wherein said polyamide is PA 6, PA 46, PA 66, PA 612, PA 1010, PA 1012, PA 11, or PA 12.

6. The thermoplastic molding composition of claim 1, wherein the number average molecular weight of said polyamide is above 5000.

7. The thermoplastic molding composition of claim 6, wherein the number average molecular weight of said polyamide is above 10,000.

8. The thermoplastic molding composition of claim 1, wherein said aspartic acid derivative is DL-aspartic acid.

9. A process for producing the thermoplastic molding composition of claim 1, comprising the steps of:
   preparing a preliminary molding composition by mixing said polyphenylene ether and said aspartic acid derivative, and in a subsequent step blending said preliminary molding composition with said polyamide.

10. The process of claim 9, wherein said preliminary molding composition is prepared by mixing said polyphenylene ether and aspartic acid derivative in a melt at a temperature from about 200–320° C.

11. The process of claim 9, wherein said preliminary molding composition is prepared by mixing said polyphenylene ether and aspartic acid derivative in a solvent solution and then removing the solvent at temperatures between about 200–320° C.

* * * * *